United States Patent

Sagara et al.

Patent Number: 5,858,895
Date of Patent: Jan. 12, 1999

[54] HEAT-RESISTANT GLASS

[75] Inventors: Hirozi Sagara; Koichi Sato, both of Tokyo, Japan

[73] Assignee: Hoya Corporation, Japan

[21] Appl. No.: 815,466

[22] Filed: Mar. 11, 1997

[30] Foreign Application Priority Data

Mar. 13, 1996 [JP] Japan ............ 8-056417

[51] Int. Cl.⁶ .................... C03C 3/064
[52] U.S. Cl. ............... 501/66; 501/67; 501/77; 501/79
[58] Field of Search ............ 501/55, 66, 67, 501/77, 79

[56] References Cited

U.S. PATENT DOCUMENTS

| | | | |
|---|---|---|---|
| 4,385,127 | 5/1983 | Chyung | 501/66 |
| 4,396,720 | 8/1983 | Beall et al. | 501/66 |
| 5,371,048 | 12/1994 | Teitz | 501/66 |
| 5,459,109 | 10/1995 | Lapp | 501/66 |

FOREIGN PATENT DOCUMENTS

| | | |
|---|---|---|
| 4-46035 | 2/1992 | Japan . |
| 4-149039 | 5/1992 | Japan . |
| 7-101748 | 4/1995 | Japan . |

*Primary Examiner*—Deborah Jones
*Attorney, Agent, or Firm*—Nixon & Vanderhye

[57] ABSTRACT

A heat-resistant glass which has heat resistance sufficient for being free from viscous flowing, e.g., at a temperature of 600° C. or higher, and devitrification resistance adequate for producing a panel of glass, which has, as thermal properties, an expansion coefficient equivalent or close to that of a sealing glass frit, with retaining electrical insulation properties excellent over conventional glass, and which can be used for the production of plate-shaped articles of glass such as a glass substrate, the heat-resistant glass containing, as glass components,

| | |
|---|---|
| 30–45% | $SiO_2$ |
| 1–10% | $B_2O_3$ |
| 1–7% | $Al_2O_3$ |
| 1–17% | SrO |
| 22–less than 35% | BaO |
| 0–5% | MgO |
| and | |
| 0–14% | CaO | the above % standing for % by weight, provided that the total amount of MgO+CaO is over 4% to 16% by weight.

6 Claims, No Drawings

HEAT-RESISTANT GLASS

FIELD OF THE INVENTION

The present invention relates to a heat-resistant glass. The heat-resistant glass of the present invention is suitable for use as a glass panel of an image display device such as a plasma display.

PRIOR ART

In the process of plasma display production, calcination or firing is carried out when a dielectric layer is formed on an electrode and when an He—Ne gas is sealed in, and the calcination or firing temperature is increased up to about 600° C. A substrate glass is therefore required to have thermal properties that it is free of deformation at a temperature of 600° C. A dielectric material used for the production of a plasma display and a glass frit for sealing have an expansion coefficient of about $82 \times 10^{-7}$/°C., and the substrate glass is therefore also required to have about the same expansion coefficient for avoiding distortion and cracking. Further, the substrate glass is also required to have an increased volume resistivity for securing the electrical insulation of a panel formed of glass.

JP-A-7-101748 and U.S. Pat. No. 5,459,109 disclose substrates for plasma display. Since, however, the content of alkali components such as $Li_2O$, $Na_2O$ and $K_2O$ in the glass disclosed in JP-A-7-101748 is 9 to 16%, the sag temperature (Ts) of the glass is 600° C. or lower, and it cannot be said that the glass has sufficient heat resistance. In the glass disclosed in U.S. Pat. No. 5,459,109, further, the MgO content is 0 to 1.5%, and the CaO content is 0 to 2.5%. That is, the total amount of MgO and CaO is relatively small, as small as 0 to 4%, and the glass therefore has a high liquidus temperature and is liable to be devitrified so that the glass is unsuitable for mass-production.

JP-A-4-46035 discloses an $SiO_2$-$B_2O_3$-$Al_2O_3$-CaO-BaO-containing glaze glass. However, this glaze glass is applied to a ceramic substrate, and it is not used in the process for the production of a substrate glass. Since the above glass contains at least 35 wt % of BaO, it has insufficient devitrification resistance and therefore not suitable for the step of producing a glass display which step essentially requires a plate molding such as a float molding.

JP-A-4-149039 discloses an $SiO_2$-$Al_2O_3$-$B_2O_3$-CaO-BaO-$Y_2O_3$-$ZrO_2$-containing glaze glass. However, this glass is also applied to a ceramic substrate, and it is not used in the process for the production of a substrate glass, either. Since the glass contains $Y_2O_3$ as an essential component, it has a small heat expansion coefficient and its heat expansion coefficient is considerably different from that of a sealing glass frit. As a result, the defect is that it undergoes cracking during calcination or firing.

SUMMARY OF THE INVENTION

It is therefore an object of the present invention to overcome the above problems and provide a heat-resistant glass which has heat resistance sufficient for being free from viscous flowing, e.g., at a temperature of 600° C. or higher, and devitrification resistance adequate for producing a panel of glass, which has, as thermal properties, an expansion coefficient equivalent or close to that of a sealing glass frit, with retaining electrical insulation properties excellent over conventional glass, and which can be preferably used for the production of plate-shaped articles of glass such as a glass substrate.

The heat-resistant glass of the present invention has a characteristic feature in that it contains, as glass components,

| 30–45%          | $SiO_2$   |
| --------------- | --------- |
| 1–10%           | $B_2O_3$  |
| 1–7%            | $Al_2O_3$ |
| 1–17%           | SrO       |
| 22–less than 35% | BaO      |
| 0–5%            | MgO       |
| and             |           |
| 0–14%           | CaO       | the above % standing for % by weight, provided that the total amount of MgO+CaO is over 4% to 16% by weight.

The heat-resistant glass of the present invention may contain at least one of $La_2O_3$, $ZrO_2$, ZnO, $TiO_2$, $As_2O_3$, $Sb_2O_3$, $SnO_2$ and $SO_3$. The content of each of the above components is as follows. The content of $La_2O_3$ is 0–14%, the content of $ZrO_2$ is 0–8%, the content of ZnO is 0–5%, the content of $TiO_2$ 0–5%, the content of $As_2O_3$ is 0–2%, the content of $Sb_2O_3$ is 0–2%, the content of $SnO_2$ is 0–2%, and the content of $SO_3$ is 0–2%, in which % stands for % by weight.

Further, the present invention is concerned with a glass plate product for use as a substrate for plasma display, obtained by molding the above heat-resistant glass of the present invention in the form of a plate.

DETAILED DESCRIPTION OF THE INVENTION

The reason for limiting each component in the heat-resistant glass of the present invention will be explained hereinafter.

$SiO_2$ is a glass-forming component and essential in the present invention. When the content of $SiO_2$ is less than 30%, the liquidus temperature (L.T.) of the glass increases. Further, when the content of $SiO_2$ exceeds 45%, the expansion coefficient of the glass is small. The content of $SiO_2$ is therefore limited to 30–45%. The content of $SiO_2$ is preferably 32 to 43%.

$B_2O_3$ is has the effect of decreasing the liquidus temperature by adding it to silicate glass, and it is therefore essential in the present invention. When the content of $B_2O_3$ is less than 1%, the liquidus temperature of the glass increases. When the above content exceeds 10%, the expansion coefficient of the glass is small. The content of $B_2O_3$ is therefore limited to 1–10%. The content of $B_2O_3$ is preferably 3–8%.

$Al_2O_3$ has the effect of improving the chemical durability and the liquidus temperature (L.T.) of the glass, and it is therefore essential in the present invention. When the content of $Al_2O_3$ is less than 1%, the chemical durability deteriorates, and the liquidus temperature increases. When the above content exceeds 7%, the expansion coefficient is small. The content of $Al_2O_3$ is therefore limited to 1–7%. The content of $Al_2O_3$ is preferably 3–5%.

BaO and SrO have the effect of decreasing the liquidus temperature when added in a proper amount, and they are essential in the present invention. When the content of SrO is less than 1% or greater than 17%, or when the content of BaO is less than 22%, or 35% or more, the liquidus temperature increases. The content of SrO is therefore limited to 1–17%, and the content of BaO is therefore limited to at least 22%—less than 35%. The content of SrO is preferably 3–15%, and the content of BaO is preferably 26–33%.

MgO and CaO have the effect of decreasing the liquidus temperature and increasing the expansion coefficient of the glass when added in a proper amount. At least one of these two components is therefore essential in the present invention. When the content of MgO exceeds 5%, or the content of CaO exceeds 14%, the liquidus temperature increases. The content of MgO is therefore limited to 0–5%, and the content of CaO is therefore limited to 0–14%. The content of MgO is preferably 0–4%, particularly preferably 0 to 3% by weight. The content of CaO is preferably 0—less than 10%, particularly preferably 0.5 to 9.5% by weight.

Further, when the total amount of MgO and CaO is 4% or less, the liquidus temperature (L.T.) increases, and the expansion coefficient decreases. Further, when the above total amount exceeds 16%, the liquidus temperature also increases. The total amount of MgO and CaO is therefore limited to over 4% to 16%. The total amount of MgO and CaO is preferably 4.5 to 14%.

$La_2O_3$ is an optional component, and the liquidus temperature can be decreased, or the glass sag temperature (Ts) can be adjusted, by adding a proper amount of $La_2O_3$. However, when the content of $La_2O_3$ exceeds 14%, the liquidus temperature increases. The content of $La_2O_3$ is therefore limited to 0–14%. The content of $La_2O_3$ is preferably 0–12%.

$ZrO_2$, ZnO and $TiO_2$ are optional components, which decrease the liquidus temperature, and improve the chemical durability, when added in a proper amount. However, when the content of $ZrO_2$ exceeds 8%, or when the content of ZnO or $TiO_2$ exceeds 5%, the heat expansion coefficient ($\alpha$) is small, and the intended heat expansion characteristic cannot be obtained. The content of $ZrO_2$ is therefore limited to 0–8%, the content of ZnO is therefore limited to 0–5%, and the content of $TiO_2$ is therefore limited to 0–5%. Preferably, the content of $ZrO_2$ is 0–6%, the content of ZnO is 0–4%, and the content of $TiO_2$ is 0–4%.

$As_2O_3$, $Sb_2O_3$, $SnO_2$ and $SO_3$ are optional components, which are effective as a clarifier when added in a proper amount. However, any one of these degrades the devitrification resistance if added in an amount of over 2%. The content of each of $As_2O_3$, $Sb_2O_3$, $SnO_2$ and $SO_3$ is therefore limited to 0–2%.

Further, components such as $Nb_2O_5$, $Ta_2O_5$, $WO_3$, $Gd_2O_3$, PbO, $Bi_2O_3$, $TeO_2$ and $P_2O_5$ may be added to such an extent that the object of the present invention is not impaired.

As raw materials for the heat-resistant glass of the present invention, any component may be used in the form of hydroxide, carbonate, nitrate, sulfate or oxide as required. These materials are weighed in a desired weight ratio and mixed to prepare a raw material blend, the blend is charged into a melting furnace heated to 1,200° C.–1,500° C., melted and clarified, and then stirred to prepare a homogeneous material, the homogeneous material is cast into a mold, and the cast material is gradually cooled, whereby the heat-resistant glass of the present invention can be obtained.

The heat-resistant glass of the present invention preferably has a glass sag temperature (Ts) of at least 670° C. and a heat expansion coefficient ($\alpha$), measured between 100° C. and 300° C., of $78 \times 10^{-7}$/°C. to $92 \times 10^{-7}$/°C.

Further, the heat-resistant glass of the present invention preferably has a liquidus temperature of 1,020° C. or lower, or shows no liquidus temperature, and it preferably has a volume resistivity of $40.0–300.0 \times 10^{14}$ Ωcm.

The above heat-resistant glass of the present invention is molded into the shape of a plate, whereby a substrate glass for an image display device such as plasma display can be obtained. Molding to the shape of a plate can be carried out by any one of a known floating method and a known down draw method without divitrification of the glass. The use of the obtained plate-shaped glass is not limited to the above, and the plate-shaped glass can be used for other glass display method.

EXAMPLES

The present invention will be explained with reference to Examples hereinafter.

Examples 1–5

Raw materials for each glass were blended so as to obtain compositions shown in Table 1. The raw material blend was placed in a crucible formed of platinum and heated to 1,400° C. with an electric melting furnace to melt it. The melt is cast into a mold, and the casting was gradually cooled to give glass samples in Examples 1 to 5. The glass samples were measured for liquidus temperatures (L.T.), glass sag temperatures (Ts), heat expansion coefficients ($\alpha$) and volume resistivities ($\rho V$).

In the measurement for liquidus temperatures (L.T.), a glass sample was maintained in a devitrification test furnace having a temperature gradient of 600° C.–1,100° C. for 1 hour, and then observed through a microscope at a magnification ratio of 100 times for a presence or an absence of a crystal. An boundary between a temperature at which a crystal was present and a temperature at which a crystal was absent was taken as a liquidus temperature. Showing no liquidus temperature means that a crystal was absent in the entire temperature range of from 600° C. to 1,100° C. after the glass sample was maintained for 1 hour.

In the measurements for glass sag temperatures (Ts) and heat expansion coefficients ($\alpha$), with a heat expansion measuring apparatus, a cylindrical glass sample having a diameter of 4 mm and a length of 15–20 mm was temperature-increased at a rate of 8° C./minute with a load of 10 g being exerted on the sample. And, a temperature at which the expansion of the glass sample was terminated by the load was taken as a glass sag temperature, and an average linear expansion coefficient in the range of from 100° C. to 300° C. was taken as a heat expansion coefficient of which the unit was $10^{-7}$/°C.

In the measurement for volume resistivities ($\rho V$) (Ω·cm), a glass sample both surfaces of which were polished and which had a diameter of 26.5 mm and a thickness of 1 mm was measured with R8340A supplied by "Advantest" at a temperature of 20° C. at a humidity of 50%.

Table 1 shows the measurement results.

Comparative Examples 1–6

Glass samples having high alkali contents were prepared according to Examples of JP-A-7-101748, and measured for liquidus temperatures, glass sag temperatures, heat expansion coefficients and volume resistivities in the same manner as in Examples 1–5. Table 2 shows the results.

Comparative Examples 7–8

Glass samples having a BaO content of 35 wt % or more were prepared according to Examples 1 and 6 of JP-A-4-46035, and measured for liquidus temperatures, glass sag temperatures, heat expansion coefficients and volume resistivities in the same manner as in Examples 1–5. Table 3 shows the results.

Comparative Example 9

A glass sample in which the total amount of MgO and CaO was 4% or less (1.4%) was prepared according to the specification of U.S. Pat. No. 5,459,109, and measured for liquidus temperatures, glass sag temperatures, heat expansion coefficients and volume resistivities in the same manner as in Examples 1–5. Table 3 shows the results.

TABLE 1

|  | Examples | | | | |
| --- | --- | --- | --- | --- | --- |
|  | 1 | 2 | 3 | 4 | 5 |
| $SiO_2$ | 32 | 42 | 36 | 37 | 36 |
| $B_2O_3$ | 8 | 4 | 3 | 3 | 3 |
| $Al_2O_3$ | 3 | 5 | 3 | 3 | 3 |
| MgO |  |  | 3 | 3 | 3 |
| CaO | 4.5 | 5.8 | 6 | 1.5 | 9.5 |
| MgO + CaO | 4.5 | 5.8 | 9 | 4.5 | 12.5 |
| SrO | 3.3 | 10 | 13 | 12 | 3.5 |
| BaO | 30 | 33 | 26 | 30.5 | 32 |
| $La_2O_3$ | 10 |  | 5 | 5 | 5 |
| $ZrO_2$ | 2 |  | 5 | 5 | 5 |
| $Li_2O$ |  |  |  |  |  |
| $Na_2O$ |  |  |  |  |  |
| $K_2O$ |  |  |  |  |  |
| ZnO |  | 4 |  |  |  |
| $TiO_2$ |  | 3 |  |  |  |
|  | $Sb_2O_3$ 0.2 | $As_2O_3$ 0.2 |  |  |  |
| Liquidus temperature (L.T.) (°C.) | * | 980 | 1,020 | 940 | 990 |
| Glass sag temperature (Ts) (°C.) | 705 | 724 | 766 | 747 | 735 |
| Heat expansion coefficient ($\alpha$) ($\times 10^{-7}$/°C.) | 83 | 82 | 86 | 80 | 84 |
| Volume resistivity ($\rho V$) ($\times 10^{14}$ $\Omega \cdot$ cm) | 61.92 | 148.1 | 273.1 | 149.6 | 128.8 |

*Showing no liquidus temperature

TABLE 2

|  | Comparative Examples | | | | | |
| --- | --- | --- | --- | --- | --- | --- |
|  | 1 | 2 | 3 | 4 | 5 | 6 |
| $SiO_2$ | 59.1 | 66.5 | 63.1 | 63.4 | 62.9 | 62.7 |
| $B_2O_3$ |  |  |  |  |  |  |
| $Al_2O_3$ | 4.2 | 2.2 | 2.4 | 2.4 | 4.2 | 4.2 |
| MgO | 3.5 | 3.9 | 3.5 | 3.5 | 3.5 | 3.5 |
| CaO | 6.2 | 6.4 | 8.4 | 8.2 | 6.9 | 6.9 |
| MgO + CaO | 9.7 | 10.3 | 11.9 | 11.7 | 10.4 | 10.4 |
| SrO |  | 2.5 |  | 3.3 |  |  |
| BaO | 12.5 | 5.5 | 9.0 | 5.5 | 9.5 | 9.5 |
| $La_2O_3$ |  |  |  |  |  |  |
| $ZrO_2$ | 1.5 |  |  |  |  |  |
| $Li_2O$ | 0.6 | 0.6 | 0.6 | 1.8 | 0.6 | 0.6 |
| $Na_2O$ | 9.8 | 9.8 | 11.5 | 9.8 | 9.6 | 9.8 |
| $K_2O$ | 2.6 | 2.6 | 1.5 | 2.6 | 2.6 | 2.6 |
| ZnO |  |  |  |  |  |  |
| $TiO_2$ |  |  |  |  |  |  |
|  |  |  |  |  |  | $CeO_2$ 0.2 |
| Liquidus temperature (L.T.) (°C.) | — | — | — | — | — | — |
| Glass sag temperature (Ts) (°C.) | 587 | 594 | 574 | 555 | 590 | 589 |
| Heat expansion coefficient ($\alpha$) ($\times 10^{-7}$/°C.) | 99 | 91 | 98 | 101 | 94 | 93 |
| Volume resistivity ($\rho V$) ($\times 10^{14}$ $\Omega \cdot$ cm) | 25.88 | 14.72 | 4.10 | 54.46 | 19.62 | 2.30 |

TABLE 3

|  | Comparative Examples | | |
| --- | --- | --- | --- |
|  | 7 | 8 | 9 |
| $SiO_2$ | 31.8 | 33.3 | 42.5 |
| $B_2O_3$ | 3.8 | 4.0 | 3.6 |
| $Al_2O_3$ | 4.4 | 4.6 | 5.1 |
| MgO |  | 0.1 |  |
| CaO | 4.3 | 4.6 | 0.7 |
| MgO + CaO | 4.3 | 4.6 | 0.7 |
| SrO | 2.3 | 2.4 | 19.3 |
| BaO | 41.6 | 43.7 | 28.5 |
| $La_2O_3$ |  |  |  |
| $ZrO_2$ |  |  |  |
| $Li_2O$ |  |  |  |
| $Na_2O$ |  |  |  |
| $K_2O$ |  |  |  |
| ZnO | 4.4 | 7.4 |  |
| $TiO_2$ |  |  |  |
|  | $Y_2O_3$ 7.4 |  | $As_2O_3$ 1.1 |
| Liquidus temperature (L.T.) (°C.) | 1,100 | 1,040 | 1,040 |
| Glass sag temperature (Ts) (°C.) | 734 | 701 | 709 |
| Heat expansion coefficient ($\alpha$) ($\times 10^{-7}$/°C.) | 87 | 88 | 79 |
| Volume resistivity ($\rho V$) ($\times 10^{14}$ $\Omega \cdot$ cm) | — | — | — |

Tables 1 to 3 show the following.

As shown in Table 2, the glass samples obtained in Comparative Examples 1 to 6 show a glass sag temperature of less than 600° C. since the alkali contents thereof are 9 to 16%, and they are therefore not sufficient in heat resistance. Further, these glass samples have small volume resistivities and are therefore poor in insulation properties.

The glass samples obtained in Comparative Examples 7 and 8 have liquidus temperatures of 1,040° C. or higher, since the BaO contents thereof are more than 35 wt %. When a sample having this glass composition is sheet-molded, the molding is possible only when the molding temperature is less than 1,040° C. regardless of a molding method, since the viscosity of the glass is too low. Therefore, the glass samples in Comparative Examples 7 and 8 have high liquidus temperatures.

The glass sample obtained in Comparative Example 9 has a small MgO+CaO total content of less than 4% (1.4%). As a result, the glass sample has a high liquidus temperature, and clearly, it is liable to undergo devitrification and is not suitable for mass production.

On the other hand, as shown in Table 1, all of the glass samples in Examples 1 to 5 have glass sag temperatures of higher than 670° C. and liquidus temperatures of 1,020° C. or lower. As a result, the glass samples are free from devitrification during sheet molding, and these glass have heat resistance properties that their sheets are free of deformation even when they are temperature-increased up to 600° C. Further, the heat expansion coefficient of these glass samples are in the range of from $78 \times 10^{-7}$/°C. to $92 \times 10^{-7}$/°C. so that conventional dielectric materials and sealing glass frit can be used together with these glass samples as they are. Moreover, these glass samples have volume resistivities greater than those of the glass samples obtained in Comparative Examples 1 to 6, and they are therefore excellent in electrical insulation properties.

According to the present invention, there is provided a glass which is excellent in heat resistance, devitrification resistance, electrical insulation properties and heat expansion properties, and which can be used as a glass sheet-shaped article such as a substrate for plasma display.

What is claimed is:

1. A heat-resistant glass containing, as glass components,

| | |
|---|---|
| 30–45% | $SiO_2$ |
| 1–10% | $B_2O_3$ |
| 1–7% | $Al_2O_3$ |
| 1–17% | $SrO$ |
| 22–less than 35% | $BaO$ |
| 0–5% | $MgO$ |
| and | |
| 0–14% | $CaO$ | the above % standing for % by weight, provided that the total amount of MgO+CaO is over 4% to 16% by weight.

2. The heat-resistant glass of claim 1, wherein the heat-resistant glass contains 0 to less than 10% by weight of CaO.

3. The heat-resistant glass of claim 1, wherein the heat-resistant glass further contains 0 to 14% by weight of $La_2O_3$, 0 to 8% by weight of $ZrO_2$, 0 to 5% by weight of ZnO, 0 to 5% by weight of $TiO_2$, 0 to 2% by weight of $As_2O_3$, 0 to 2% by weight of $Sb_2O_3$, 0 to 2% by weight of $SnO_2$ and 0 to 2% by weight of $SO_3$.

4. The heat-resistant glass of claim 1, wherein the heat-resistant glass has a glass sag temperature (Ts) of at least 670° C., and a heat expansion coefficient ($\alpha$), measured between 100° C. and 300° C., of $78\times10^{-7}$/°C. to $92\times10^{-7}$/°C.

5. A glass article obtained by sheet-molding the heat-resistance glass of claim 1.

6. A plasma display substrate made of the heat-resistant glass of claim 1.

* * * * *